(12) United States Patent
Rimas-Ribikauskas et al.

(10) Patent No.: US 8,147,248 B2
(45) Date of Patent: Apr. 3, 2012

(54) GESTURE TRAINING

(75) Inventors: Emily Rimas-Ribikauskas, Seattle, WA (US); Richard J. Duncan, Kirkland, WA (US); Zoltan Szilagyi, Bellevue, WA (US); Eric B. Fox, Seattle, WA (US); Shawna J. Davis, Seattle, WA (US); David B. Perry, Lynnswood, WA (US); Ernest L. Pennington, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 313 days.

(21) Appl. No.: 11/084,184

(22) Filed: Mar. 21, 2005

(65) Prior Publication Data

US 2006/0210958 A1    Sep. 21, 2006

(51) Int. Cl.
*G09B 19/00* (2006.01)
(52) U.S. Cl. .............. 434/118; 434/155; 434/307 R; 434/365; 715/863; 715/865
(58) Field of Classification Search .............. 434/118, 434/112, 307 R, 323, 365, 155, 362; 715/863, 715/865
See application file for complete search history.

(56) References Cited

U.S. PATENT DOCUMENTS

| | | | |
|---|---|---|---|
| 4,798,543 A * | 1/1989 | Spiece ................. | 434/323 |
| 5,010,500 A * | 4/1991 | Makkuni et al. ........... | 715/863 |
| 5,347,295 A * | 9/1994 | Agulnick et al. ........... | 345/156 |
| 5,550,930 A * | 8/1996 | Berman et al. ............. | 382/187 |
| 5,563,996 A * | 10/1996 | Tchao ................. | 715/201 |
| 5,570,113 A * | 10/1996 | Zetts ................. | 345/173 |
| 5,583,946 A * | 12/1996 | Gourdol ................. | 382/187 |
| 5,592,608 A * | 1/1997 | Weber et al. ........... | 715/863 |
| 5,784,504 A * | 7/1998 | Anderson et al. ......... | 382/309 |
| 5,887,069 A * | 3/1999 | Sakou et al. ............. | 382/100 |
| 6,057,845 A * | 5/2000 | Dupouy ................. | 715/863 |
| 6,215,901 B1 * | 4/2001 | Schwartz ................. | 382/186 |
| 6,249,606 B1 * | 6/2001 | Kiraly et al. ............. | 382/195 |
| 6,304,674 B1 * | 10/2001 | Cass et al. ................. | 382/224 |
| 6,366,300 B1 * | 4/2002 | Ohara et al. ............. | 715/771 |
| 6,502,114 B1 * | 12/2002 | Forcier ................. | 715/273 |
| 6,735,632 B1 * | 5/2004 | Kiraly et al. ............. | 709/229 |
| 6,903,730 B2 * | 6/2005 | Mathews et al. ......... | 345/179 |
| 7,000,200 B1 * | 2/2006 | Martins ................. | 715/863 |
| 7,453,439 B1 * | 11/2008 | Kushler et al. ............. | 345/168 |
| 7,554,530 B2 * | 6/2009 | Mizobuchi et al. ......... | 345/173 |
| 2003/0071850 A1 * | 4/2003 | Geidl ................. | 345/781 |
| 2003/0129574 A1 * | 7/2003 | Ferriol et al. ............. | 434/362 |
| 2004/0030753 A1 * | 2/2004 | Horvitz ................. | 709/206 |
| 2005/0057524 A1 * | 3/2005 | Hill et al. ................. | 345/173 |
| 2005/0210419 A1 * | 9/2005 | Kela et al. ............. | 715/863 |
| 2005/0221267 A1 * | 10/2005 | Berman ................. | 434/323 |
| 2006/0026521 A1 * | 2/2006 | Hotelling et al. ......... | 715/702 |
| 2006/0028429 A1 * | 2/2006 | Kanevsky et al. ......... | 345/156 |
| 2006/0071915 A1 * | 4/2006 | Rehm ................. | 345/173 |
| 2006/0085767 A1 * | 4/2006 | Hinckley et al. ............. | 715/863 |
| 2006/0209014 A1 * | 9/2006 | Duncan et al. ............. | 345/156 |
| 2006/0242607 A1 * | 10/2006 | Hudson ................. | 715/863 |

* cited by examiner

*Primary Examiner* — Xuan Thai
*Assistant Examiner* — Bruk Gebremichael
(74) *Attorney, Agent, or Firm* — Shook Hardy & Bacon L.L.P.

(57) ABSTRACT

A system and method for training a user to perform a flick gesture is described. A flick gesture is a simple gesture that may be easily detected and is characterized by minimal interference with other applications or gestures.

15 Claims, 12 Drawing Sheets

GESTURE TRAINING

BACKGROUND OF THE INVENTION

1. Field of the Invention

Aspects of the present invention relate to computing systems. More particularly, aspects of the present invention relate to a system and process for teaching a user to make a hand-written gesture.

2. Description of Related Art

Computing systems accept a variety of inputs. Some computer applications accept gestures formed by pointing devices to enable easier control and navigation of the applications. A gesture is a pattern of motion input from a pointing device that the system interprets as meaning more than pointing, or meaning something other than pointing. The difficulty, however, with conventional gesture recognizers is that they provide too many false positives and false negatives. When a user is using a pointing device (for instance, (1) stylus with a pen digitizer, (2) finger with a touch digitizer, (3) mouse), a system may interpret normal actions from the pointing device as gestures and implement the functions associated with the gestures to the bewilderment of the user. Likewise, a user may become frustrated when trying to perform a gesture and the computing system does not recognize the user's effort as a gesture.

In computer systems or computer applications that recognize and assign functions to gestures, the pattern of movement from the pointing device alone is generally used to determine whether or not a gesture has occurred. An issue with using shape alone is that slow movement of the stylus or mouse for mouse-wielding users may have a tendency to perform actions that may be recognized as gestures, despite the intentions of the users to the contrary.

Marking menus (also referred to as radial menus) are menus that may be accessed through interaction with a pointing device. Maya and Alias applications of Alias Systems Corp. of Toronto, Ontario, Canada provide examples of marking menus. While similar to gestures in that they include start and stop locations, marking menus are considered menus in that the relevant part of the user input is the location of a button up or stylus up event irrespective of the time to create the gesture. Further, marking menus generally require a specific input to invoke the menu in the first place.

Also, training for performing gestures is sometimes complicated. While adequately training a user how to perform a gesture, conventional training systems that show a single page of gestures without training can be unnecessarily obtrusive or difficult to display when desired.

An improved gesture training system is needed.

BRIEF SUMMARY OF THE INVENTION

Aspects of the present invention address one or more of the problems described above, thereby providing a training process for training users how to perform gestures.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
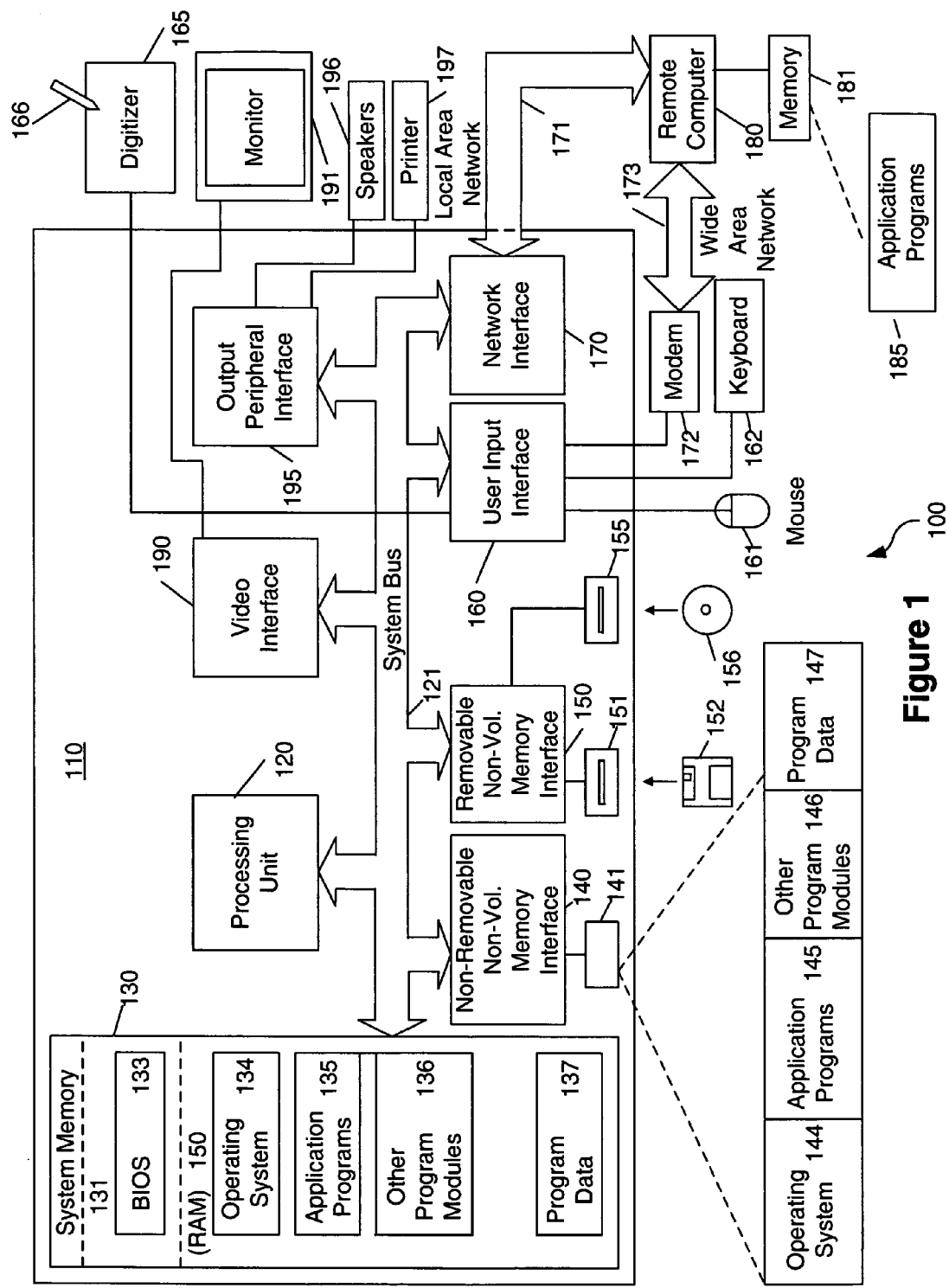
FIG. 1 shows an illustrative example of a general-purpose computing environment in accordance with aspects of the present invention.

Aspects of the present invention relate to training a user on how to perform gestures including but not limited to flick gestures.

This document is divided into sections to assist the reader. These sections include: characteristics of ink, terms, general-purpose computing environment, gestures, a flick gesture, flick gesture determination, training, and illustrative implementations.

It is noted that various connections are set forth between elements in the following description. It is noted that these connections in general and, unless specified otherwise, may be direct or indirect and that this specification is not intended to be limiting in this respect.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Terms

Ink A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level Ink object A data structure storing ink with or without properties.

Stroke A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point Information defining a location in space. For example, the points may be defined relative to a capturing space (for example, points on a digitizer), a virtual ink space (the coordinates in a space into which captured ink is placed), and/or display space (the points or pixels of a display device).

Document Any electronic file that has a viewable representation and content. A document may include a web page, a word processing document, a note page or pad, a spreadsheet, a visual presentation, a database record, image files, and combinations thereof.

Flick A short, quick, straight movement of a pointing device of a computer system. Where the pointing device is a stylus or finger, the flick may occur on the surface of the stylus-enabled computer or may occur above its surface. Where the pointing device is a mouse, the movement may occur with a mouse button being held down or without a mouse button being held down. The flick may create a stroke as defined above. It is noted that strokes may be created by other activities as well including but not limited to drawing or inking with a pointing device. An advantage of using a stylus to perform a flick gesture is that it permits one to use flick gestures in combination with pen-enabled computers (using active pens and static pens). An advantage of using a mouse to perform a flick gesture is that mice are commonly found with most computers. An advantage of using a finger as a pointing device (on a touch-based digitizer) to perform a flick gesture is that some users prefer using a finger as compared to a stylus on pen-based computers—allowing users to use their finger to perform flicks provides them the functionality of a flick without using additional hardware.

Flick Action These are the functions which occur when flick is successfully recognized. These may be different based on the direction a user flicks or many other factors (e.g., whether a modifier key (such as when the Shift key is held down during a flick gesture)).

Feedback UI The user interface that appears as soon as a flick gesture has been successfully recognized.

Learning Mode In this mode, flicks will be on by default in a limited number of applications. This purpose of this mode is to introduce users to flicks in an environment that does not affect currently opened documents.

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
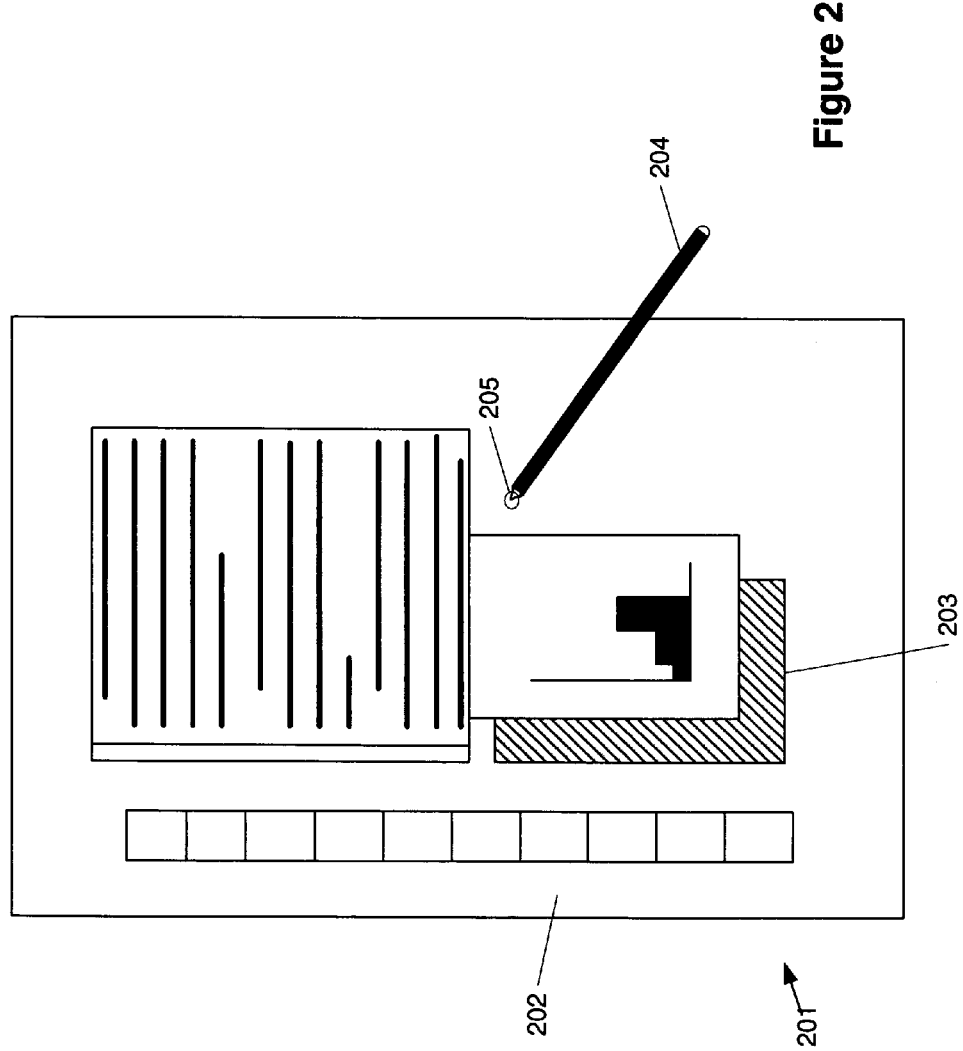
FIG. 2 shows an illustrative example of a tablet computer in accordance with aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Gestures

Gestures are ways to invoke an action, similar to clicking a toolbar button or typing a keyboard shortcut. Gestures may be performed with a pointing device (including but not limited to a mouse, stylus, and/or finger). A gesture has a shape associated with it. The shape may be as simple as a point (clicking a mouse button for instance) or as complicated as a series of movements. The gesture also has a position associated with it as well. The position is relative to the digitizer or a screen via a digitizer-to-screen mapping. This provides the benefit that the user interface is then able to display information relating to the gesture proximate the position of the gesture. The position may be used to dictate the scope, target, and/or meaning of the gesture. In some cases, the position is not relevant to the gesture.

A Flick Gesture

Gesture recognition has been used in computing systems for years. However, many developers and end-users disable gestures because of difficulties and complexities created by gestures. For instance, most gesture recognition engines suffer from an unacceptably high number of false positives and false negatives when recognizing gestures. These false positives (where a system determines a user input is a gesture when the user input was not intended as a gesture) and false negatives (where a system determines a user input not to be a gesture when a user has tried to perform a gesture) frustrate developers and end-users alike.

A flick gesture, as described herein, is a simple gesture that includes a single movement of a pointing device. A flick gesture has a distinct pattern that distinguishes it from other actions that a user may perform (for example, a short, quick drag). Thus, a system may unambiguously determine that a flick gesture has occurred. Because a system can quickly determine whether a flick gesture has occurred, the gesture may be performed in a non-gesture mode (for instance, a normal input or operating mode) of the system. Further, a flick gesture is easy for the user to remember and perform. Once a user has mastered a flick gesture, it can be applied in multiple directions to accomplish different tasks. Also, a flick gesture is easy for the system to recognize and discriminate against other actions (including drag, selection, etc.)

An application developer, system developer, system user, and/or application user may associate operations with the flick gesture. These operations may include navigation forward, backward, scrolling up or down, changing applications, right click (which may or may not otherwise be present in a stylus-based system), and custom application commands. Custom application commands are commands pertinent to applications that are specific to those applications and not generally usable across other applications. Further, a flick gesture does not need to have a predefined meaning but rather may be customizable by a developer or user to perform a key or key combination so that a user may have quick access to keyboard shortcuts or macros especially in a keyboard-less environment (as some computers lack keyboards). One benefit of enabling gestures is that it allows users to be more productive, to overcome feelings of being unproductive when not using a keyboard.

The flick gesture may be consistent in its associated function across all applications in an operating system. Alternatively, a flick gesture may be contextual in the function associated with it (where the resulting operation tied to the flick gesture varies based on an application in which the flick gesture occurred).

Also, flick gestures may be specific to locations in an application (for instance, in a title bar) or whether a selection has been made or not (for instance, the gesture may perform cut, copy, paste, and/or paste special operations). Additionally or alternatively, states of a computer may be used in determining which action associated with a flick gesture should be performed. For instance, a color of a currently selected object, which user is logged into the system, whether an external monitor is connected to the system, which application has keyboard focus, and the like—in short, any state or combination of states of a computing system or object—may be used to determine what action is to be performed in response to a flick gesture.

Further, different input devices may modify actions associated with flick gestures. For instance, a first set of actions may be associated with flick gestures when performed by a stylus. A second set of actions may be associated with flick gestures when performed by another pointing device or when performing a gesture when a pen button is depressed. The number of sets of actions may be varied by the number of different input devices.

Further, hot zones may or may not be enabled where a flick in the hot zone may have yet another operation. Hot zones may include specific regions of a display and/or radial menus.

The flick gesture may be direction independent or may be direction specific. If direction specific, the direction the flick is drawn in will determine the outcome. The flick gesture characteristics may or may not vary based on direction. For instance, the system may have only one set of parameters for recognizing a flick gesture. Alternatively, the system may have any number of parameters that vary depending on the direction of the flick to accommodate left or right-handedness, angle of a stylus, and the like. These parameters may be modified to bias the ease of performing a flick gesture in certain directions.

Once the user learns how to perform flick gestures, she is only required to learn the actions linked to each of the available directions. The actions associated with each of the directions may be customizable allowing a user to have a personalized and optimized experience.

Flick gestures may be used alone. Alternatively, the flick gestures may be combined to perform additional actions. For instance, a flick gesture upwards may perform a page up action while two flick gestures both in the upwards direction may perform a move action that moves to the top of a document.

In alternative embodiments, flick gestures may be enabled through pressing a button on a stylus or by pressing a right mouse button (secondary mouse button) on a mouse while still satisfying any movement and time thresholds. However, one advantage of the flick gesture is that it may be performed with a left mouse button click or with a stylus or finger without changing modes. The flick gesture may increase a user's productivity and allows them to interact with their desktop and applications at a more effective level than was previously available. The gestures are designed such that a user has to do a minimal level of training/remembering in order to gain a significant benefit; once the gesture is mastered by a user they are only required to learn the direction-action association. Distinguishing between normal mouse or stylus movements and a flick gesture may be made based on a various criteria and constraints placed on the flick gesture.

Flick gestures may allow users to dispense with navigating to scrollbars or navigation buttons and using flick gestures to provide the same function. This may include reading documents or navigating documents with or without hyperlinks. Reading documents of this type may be performed online and offline. Additionally, common actions including cut, copy, and paste may be performed using flick gestures.

Flick Gesture Determination

A flick gesture can be performed by a user simply by flicking their input device (pen or finger against the screen or using a mouse to perform a flick). Flick gestures may be performed in the natural mode without necessarily requiring the user to enter any modes—although a mode requirement may be made, for example, requiring the user to hold the pen button/hold a mouse button/depress a separate button when flicking using his or her finger while performing a flick gesture. Flick gestures can be done in 8 directions (for instance), with each flick falls into one of the 8 directions. The occurrence of a flick gesture may be determined based on a profile of the physical or logical x and y co-ordinates and the pressure (or location) charted against time. In short, the three basic characteristics that may be used to determine whether a flick gesture has occurred include the direction of the flick, the movement of the flick, and the timing of the flick. The movement threshold may be, for example, greater than 1 cm and the time threshold less than 0.2 ms. These values of course may be varied to accommodate all users. Using these characteristics, a system may calculate other aspects of a flick which may be more readily compared against thresholds. For instance, the system may calculate velocity, acceleration, curvature, lift, pressure, and the like and use these derived values or sets of values to determine if a user has performed a flick gesture.

An additional optional consideration may include the movement in the air (related to pen-based flick gestures) just before or just after the flick gesture. Further, the system may allow the user to customize the detection and/or have the system to learn or adapt to the user's style of flicking.

Flick gestures may be determined apart from other gestures including a double actuation (double tap or click), press and hold, hold and drag, and other gestures.

Other methods such as neural networks may also be used to attempt to classify flick gestures based on combinations of input characteristics derived from the three basic characteristics.

One of the benefits of using these criteria to determine whether a flick gesture has occurred is the minimization of false negatives and false positives while minimizing the detection time of the flick gestures. In combination, these benefits provide for overall improved system responsiveness. For instance, the procedure for determining whether a flick has occurred may be organized so as to quickly determine that a flick does not meet the qualifications for a flick gesture and permit the input device movement to be treated as a normal input device movement.

Aspects of the present invention may include rendering a flick movement and/or action associated with a normal input device action while the system is determining whether or not the flick is indeed a flick gesture. Alternatively, aspects of the present invention may include preventing input information (received from the user operating the pointing device) from being processed or rendered until the system determines whether or not a flick gesture has occurred. While this latter approach may cause a slight, visual delay in feedback to a user, it may improve the user's ability to perform flick gestures in the presence of objects that may be manipulated with a normal input. For instance, performing a flick over an object may be processed as a normal input, resulting in dragging and dropping the object, while a flick gesture may have been intended. Accordingly, these alternative aspects of the invention may hold the input received from the user (that may or may not be a flick gesture) until the system determines whether they are a flick gesture or not.

Figure 3:
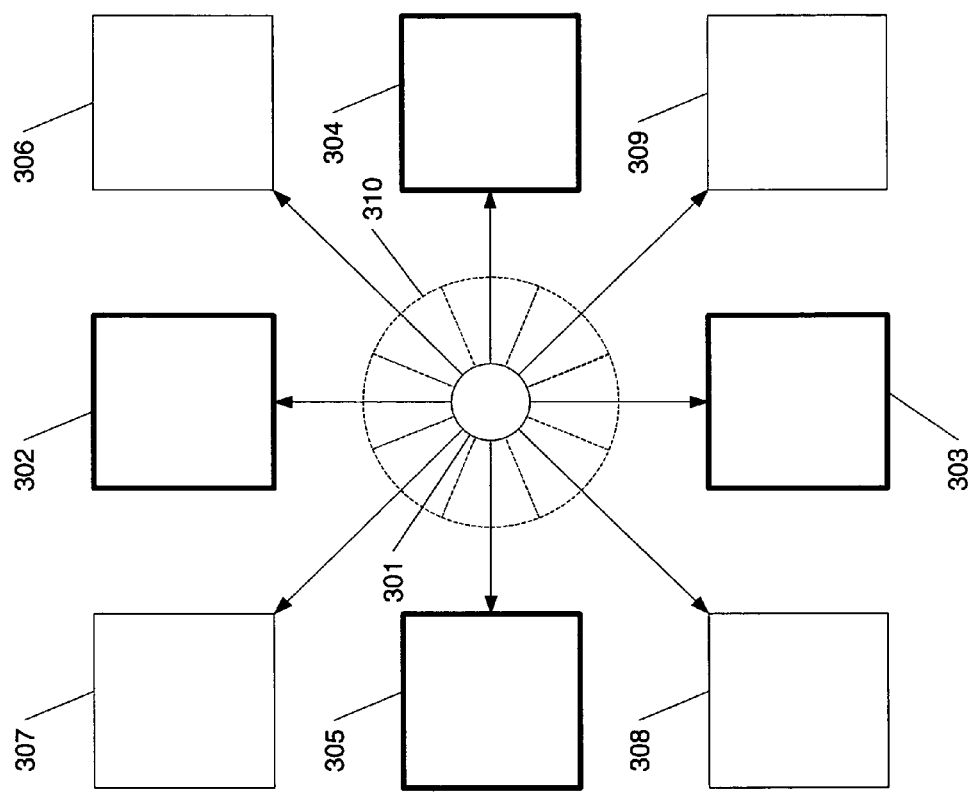
FIG. 3 shows various regions relating to the training of a user and how to perform a flick gesture in accordance with aspects of the present invention.

FIG. 3 shows the various illustrative directions that may be used for the flick gesture. Origin 301 is where it a flick gesture starts. Four cardinal regions 302-305 are shown as well as four diagonal regions are shown 306-309. The system may treat all eight regions identically with respect to determination of which direction a flick gesture has traveled. Alternatively, some regions (for instance, the cardinal directions) may be biased to classify a user's input as falling into one of these directions over the diagonal directions. The number of different directions may be fixed or modifiable. For instance, one may alternatively use 6 or 12 or any number of directions as the number of directions available to a user.

In order to determine the flick direction, the pen down point represent the center of a circle 301, there may be 8 equally shaped and spaced regions surrounding the center, each a 45 degree section of the circle, for instance. These regions are not dependent on the orientation of the tablet, and rotate accordingly when tablet is rotated.

The regions do not need to be restricted to 45 degrees, and could be larger or smaller depending on the application. However, the ones used by default throughout the system may initially be set at 45 degrees.

A flick gesture, by definition, starts at location 301 shown in FIG. 3, as the pen down (or left mouse click) point is the center; and a short, quick, straight stroke with minimal drop in velocity (with or without continued in-air movement in the same direction), termed a flick, is drawn out for the pen down point. By definition of a flick, being short and straight, it will fall into one of the regions. Whichever region it is drawn in may determine the action which is fired. A flick region is determined by connecting the starting and ending points of the stroke which are in contact with the screen, provided the stroke meets a quality of a flick (which may or may not include the straightness, length and speed requirement as set forth herein). Circle 310 with eight regions shown in broken lines shows general separation areas of regions receiving flick gestures. If the flick falls on the exact line which separates the regions of circle 310, the flick may default to the regions non-diagonal region, or those representing the horizontal or vertical direction.

Upon successful recognition of a flick gesture, feedback may or may not be provided to a user, where the feedback indicates that the flick gesture a user has just performed has been recognized and that a message is being sent to the operating system or application. The feedback may also indicate the action that has been fired. This feedback does not mean that an action will take place, only that a successful flick has been recognized and is being sent. If, for example, a user continues to perform page down flick gestures once she has reached the bottom of the page, she will still get the correct feedback although no action will be resulting as they can scroll no further down the page.

This feedback may appear as soon as a successful gesture is recognized and will remain for a short period of time (in the vicinity of 500 ms), as which time it will disappear. Alternatively, no feedback may be provided. Further, in additional alternate aspects, the feedback may be animated to more readily inform a user that a successful flick gesture has been recognized. An animation may or may not provide the user with feedback of a direction associated with the recognized flick gesture. Further, audio feedback may optionally be used.

Figure 4:
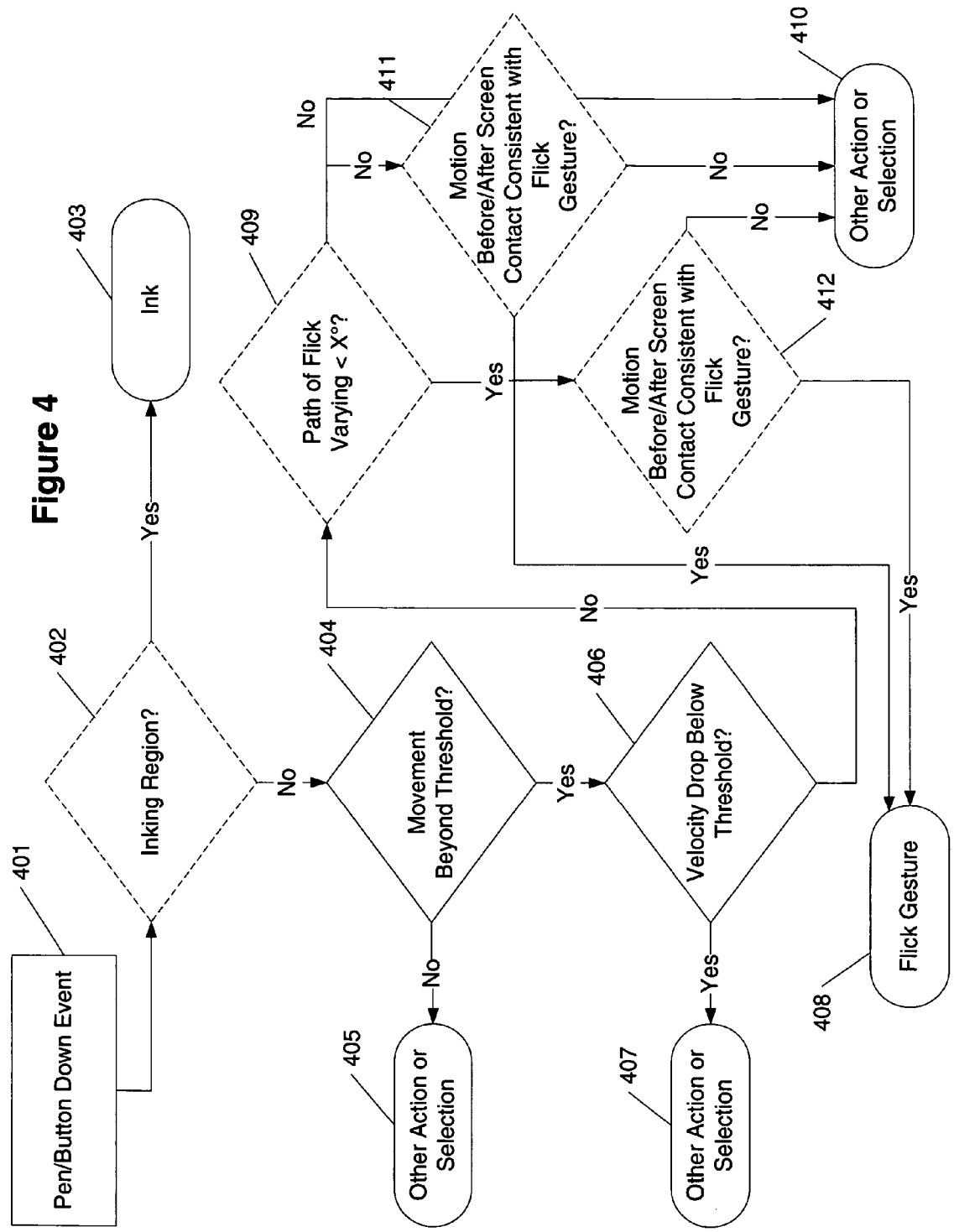
FIG. 4 shows processes for determining whether a flick gesture has occurred in accordance with aspects of the present invention.

FIG. 4 shows an illustrative procedure for determining if a flick has occurred. Other procedures for detecting whether a flick gesture has occurred may be used in place of the procedure shown in FIG. 4. In step 401, a pen down or button down event occurs. Next in step 404, the system determines if there was movement beyond a movement threshold (for instance, beyond 0.2-0.5 cm). If no, then the system may determine that the input being received is some other action or selection as shown in step 405. If there was movement beyond the threshold from step 404, then the system determines if a velocity of the input device has dropped below a velocity threshold (for instance 20% or less of the highest velocity or 5 cm per second or less). The drop may or may not be sensitive for a drop in the velocity for brief interval (10-200 ms). Alternatively, the process may determine if the velocity of the received gesture is not decreasing.

If no from step 406, then another action or selection is determined in step 407. If yes from step 406, then a flick gesture is determined to have occurred in step 408. The current location may be considered to be any location along the path of the flick including but not limited to the location of the stylus or finger being lifted from a screen or mouse button being released.

The following describes optional additions to the process of FIG. 4. From step 401, the system may determine if a pen down location was in an inking region. If yes, then the system may believe the pen down event to relate to the creation of ink as shown in step 403. This may or may not include additional operations (for example, actually creating ink, selecting, erasing ink, and not permitting a flick stroke).

Another optional step includes step 409. In step 409, the system determines if the path of the possible flick gesture is relatively straight. This may include a determination of whether all points in the gesture lie within a predefined angle from an initial contact point. This initial angle may include 45° or less. If no, then the process may conclude that the input is not a flick gesture in step 410.

A further optional set of steps (411 and 412) includes analyzing the motion of the pointing device before and/or after it contacts the screen. For example, by noticing that a stylus continues in a straight line for some distance after the stylus tip or leaves the screen, one may further refine the precision of the detection algorithm. The approach of steps 409 and 412 help to quickly get rid of flicks that are not flick gestures. Alternatively, the approach of steps 409 and 411, while more complex and functionally slower (because this alternative approach may interpret flicks as flick gestures that had been rejected before), may be more tolerant of user movements.

Once a successful flick has taken place, the system may alert other aspects of the system or application that a flick gesture has occurred. A message may be sent such that an application can perform the associated behavior with that action, if there is no assigned behavior the flick architecture may send a default value for the application to interpret. For example, if a Back command is sent to an application, this may be interpreted as Back command in the browser, or as previous entry in a database application. More particularly, a variety of different approaches may be applied to handling flick gestures. First, a flick gesture may be interpreted by the operating system and handled there. The mapping from a given direction to the semantic may be performed by the system or may be omitted. Second, the mapping of the flick to a flick action may be made in the operating system but sent to the application or applications for handling. The system may communicate just the original direction of the flick (either by indicating a predefined region or the exact detected angle of the flick) to one or more applications programs, it may communicate the semantic, or communicate both. Third, the system may communicate the flick to an application or application where the application or applications interpret the flick as a flick gesture. The application program or programs may interpret the predefined region, exact angle, semantic message, or some combination of the three. The application or applications can then handle the flick gesture or send it back to the operating system for handling.

Flick gestures may apply at the pen down location of the flick or to the current focus, foreground application, or cursor location. Flick gestures are not limited to navigation but may be used to perform other operations as well. For instance, user may want to have a flick gesture perform a right-click operation at the location of a stylus contacting a screen.

Developers may be able to turn flick gestures off in their applications or in a specific area of their applications, such as scrollbars and the like. In addition, developers may be prevented from customizing flick gestures or, alternatively, may be able to customize flick gestures to take specific actions in their application. Further, flick gestures may or may not be enabled to provide custom feedback in applications as well.

Training

Various training systems may be used in accordance with aspects of the present invention. For instance a user may opt to perform training. Alternatively, the system may monitor a user's actions and, after a while or when an action is performed, the system may then prompt the user to perform gesture training.

Figure 5:
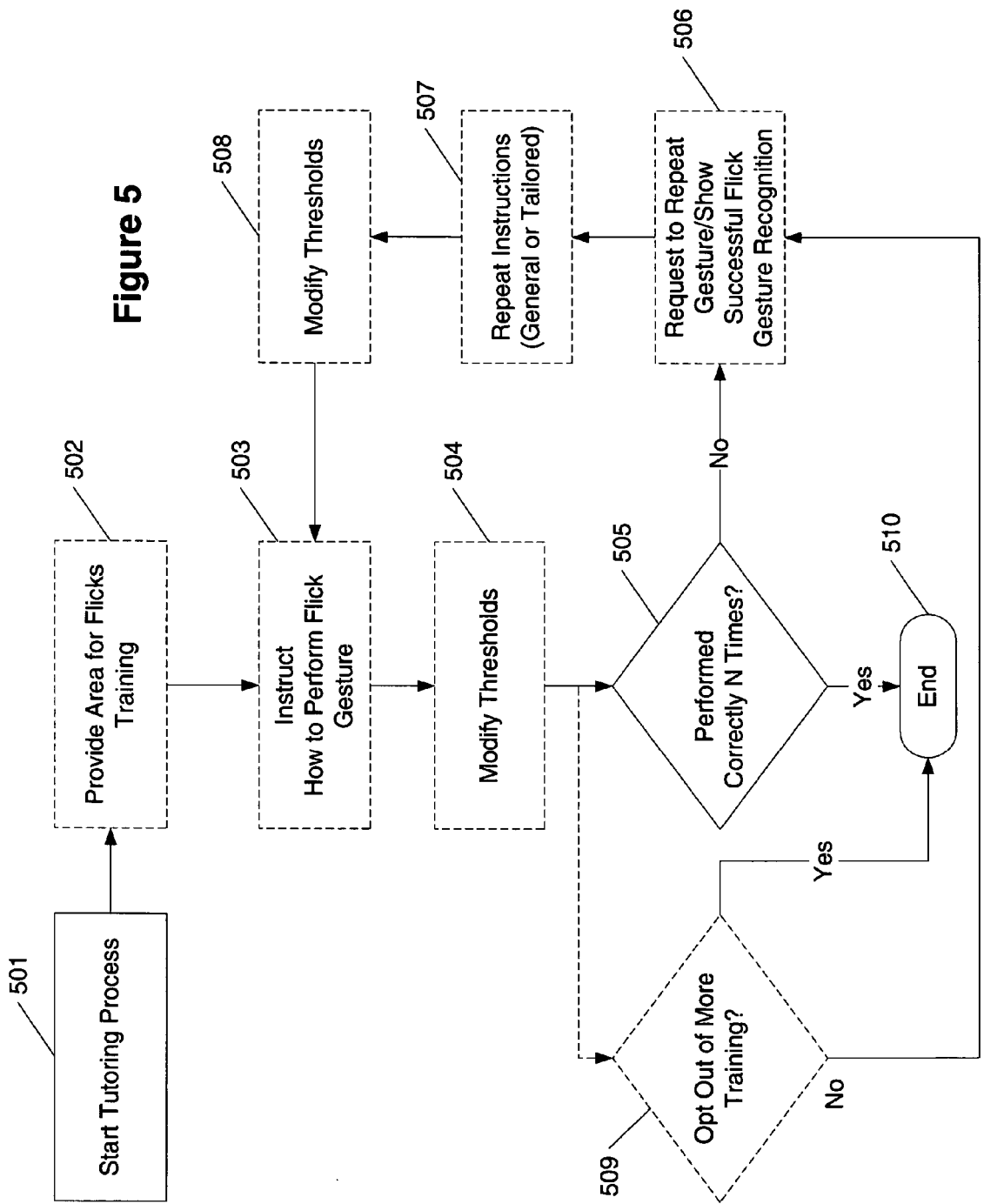
FIG. 5 shows an illustrative tutorial process for providing instruction to a user in accordance with aspects of the present invention.

FIG. 5 shows an illustrative process for training users to be able to perform a flick gesture. It is appreciated that any number of processes may be used to train users to perform flick gestures, of which a number of processes are shown in FIG. 5 with the direct and optional steps. Further, systems may implement flick gestures as described herein without providing training on how to perform flick gestures.

In step 501, the system begins a tutoring process. In step 505, the system determines if a user has performed a flick gesture N number of times (five or ten or so). If yes, then the system ends the tutorial process in step 510. If no from step 505, then the system requests more flick gestures in order to attempt to train the user. Alternatively, a user may be permitted to opt out from further training in step 509.

FIG. 5 also shows a number of additional optional components that may be included in training steps. In step 502, the system may provide an area where the user can practice flicks. In step 503, the system may instruct a user how to perform a flick gesture. In steps 504 and 508, the system may modify the thresholds of FIG. 4 to make flick gesture recognition easier or more closely model the actions a user is performing. In step 506, the system may request a user to repeat the gesture. Alternatively, or in addition to the request to repeat the gesture in step 506, the system may display an indication that the gesture was performed correctly. In step 507, the system may repeat instructions to a user on how to properly perform a flick gesture. The instructions may be general or may also include an explanation of specific improvements a user can make based on the previous attempt or attempts at performing a flick gesture. For instance, the process may indicate that the flick gesture was performed properly or provides them with a helpful tip to perform a flick successfully (e.g., flick faster or flick straighter, etc.).

Figure 6:
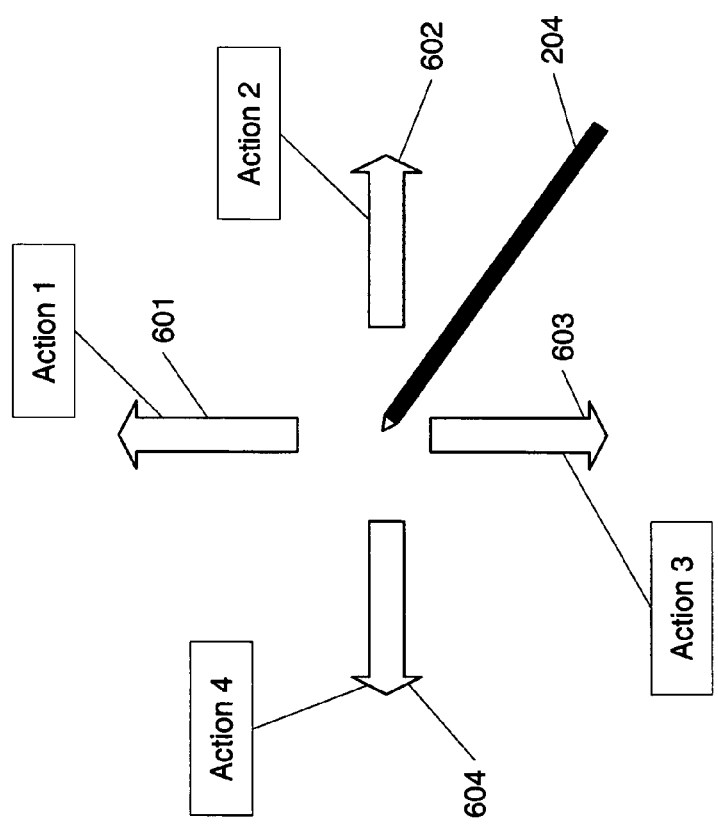
FIG. 6 shows the association of actions with flick gesture performed in specified directions in accordance with aspects of the present invention.

FIG. 6 shows a stylus 204 and flick gesture directions 601-604. Each of the directions 601-604 have an action 1-4 associated with them, respectively. The various actions may be predefined per application, per operating system, manually defined by a user, and variations thereof.

FIG. 6 shows actions 1-4 associated with the four primary quadrants (up, down, left, right). An example of assignments for the actions may include:
- up=page down
- down=page up
- left=back
- right=forward Further, additional directions may be associated with actions as follows (of course, other actions may be used in place of the following or in conjunction with the following based on alternate input—for instance, if a pen button or keyboard key is depressed):
- up=page down
- down=page up
- left=back
- right=forward
- up-left=copy
- up-right=paste
- down-left=undo
- down-right=delete In one example, all eight directions above may be used and taught in a training mode. Alternatively, only the cardinal directions (up, down, left, right) may be used during the training mode.

The above assignments may be intuitive to a person who is familiar with stylus-based computing systems. However, for new users, the system can capitalize on a discovery model in which the training wizard may be initiated upon the performance of a gesture, whether intentional or unintentional.

For instance, when a user performs a flick gesture for the first time or one of the first N times the user performs this gesture, a user interface may appear that indicates that a user has just performed a flick gesture. The flick may extend naturally from another action (for example, panning using drag and drop of a currently displayed page (akin to grabbing and sliding a current view), and the like). The notification may be specific to the direction the user flicked and the action associated with that direction. For instance, the notification may indicate that a user has performed a successful flick gesture.

Also, gestures may be associated with operations that may be difficult to perform with one input device as compared to another. For instance, using a pen to operate a scroll bar can be difficult. A flick gesture may be an easier way to scroll. Accordingly, when a user attempts to use a pen to operate a scroll bar, for instance, the system may notify the user of the ability to use flick gestures and their benefits.

Figure 7:
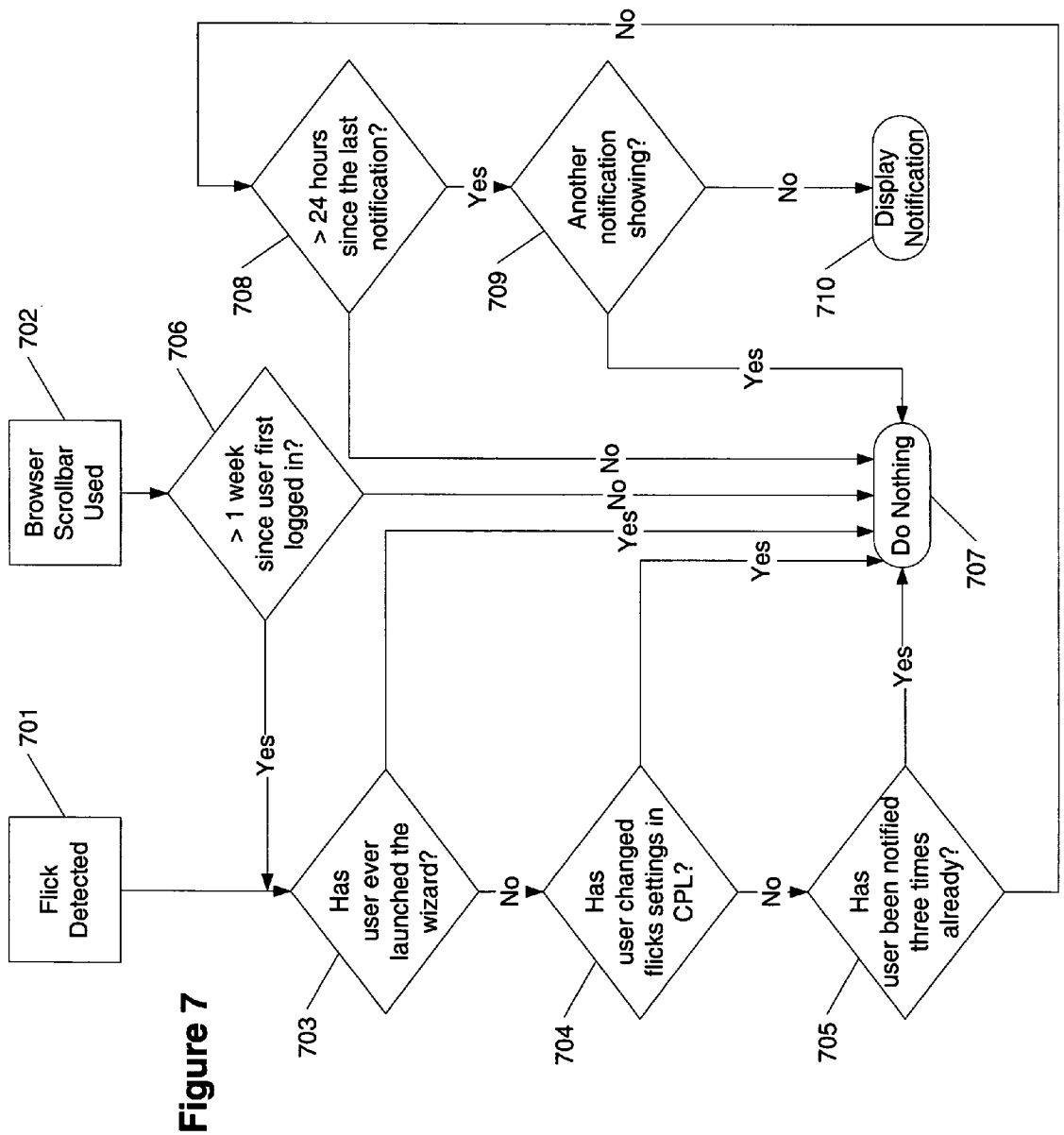
FIG. 7 shows a procedure for determining when to display a training notification in accordance with aspects of the present invention.

FIG. 7 shows a process for determining whether a training wizard should be launched. The process starts when it a flick gesture has been detected in step 701 or if a user accesses a browser scroll bar in step 702. If a flick has been detected in step 701, the system determines whether the user has ever launched the wizard in step 703. If yes, then the procedure does nothing (does not start the training wizard) as shown in step 707. If no from step 703, then the system determines in step 704 if a user has changed flick settings in a control panel dialog. If yes from step 704, then the system does nothing as shown in step 707. Alternatively, in step 705, the system determines if that user has been notified a predetermined number of times (for instance, three). If yes from step 705, then the procedure does nothing in step 707. Alternatively, the procedure determines in step 708 whether more than 24 hours have elapsed since the last notification. If no, then the procedure steps to step 707. If yes, then the procedure determines if another notification is showing in step 709. If yes, then the procedure moves to step 707. If no, then the procedure displays the notification in step 710.

Figure 8:
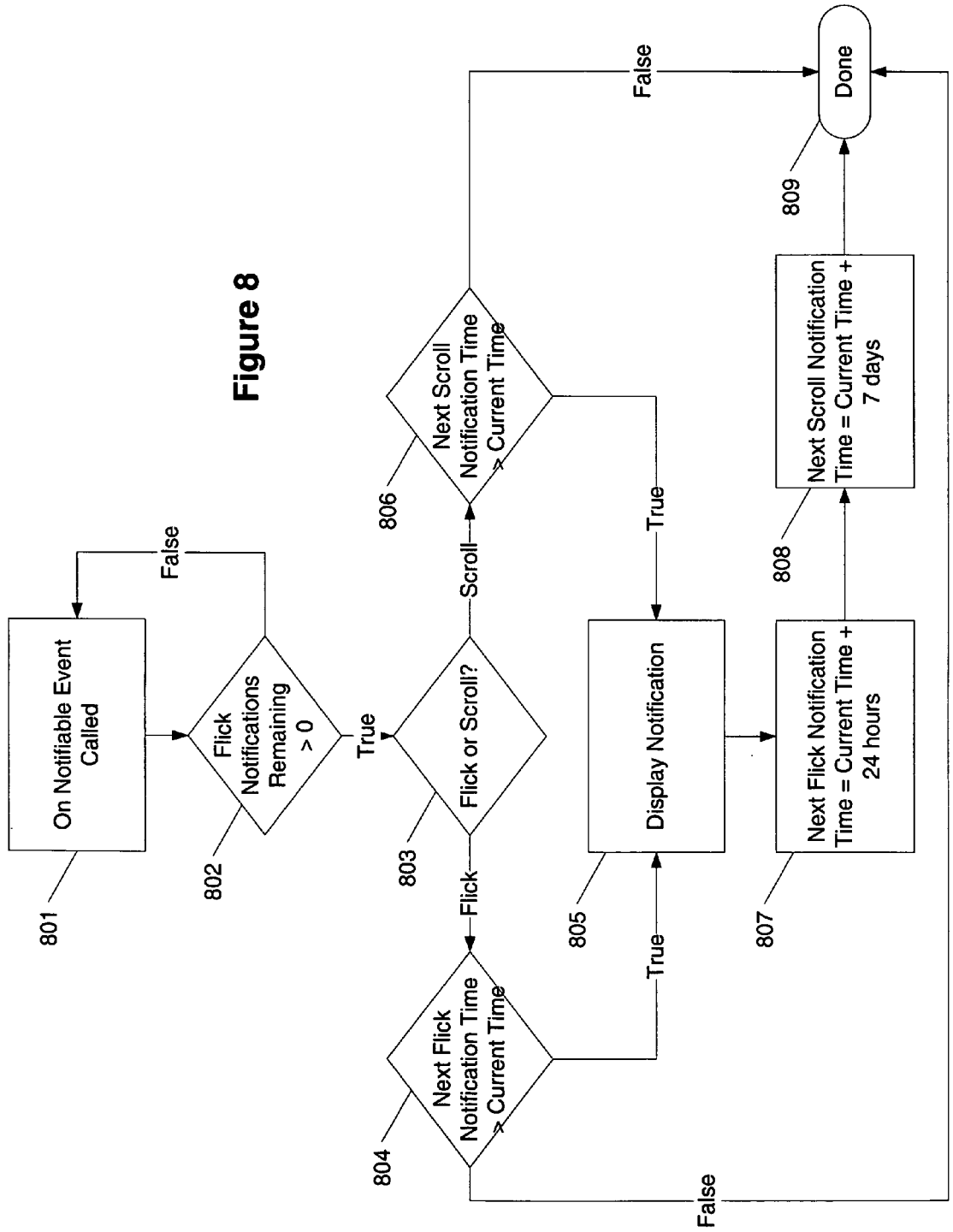
FIG. 8 shows a procedure for determining when next to display a notification in accordance with aspects of the present convention.

FIG. 8 relates to modifying how a notification may be displayed to the user based on how the notification was triggered. In step 801, the system responds to an event that relates to a flick gesture. In step 802, the system determines whether a predetermined number of flick notifications remain. If false, then the system returns to step 801. If true from step 802, the system determines in step 803 whether the notifiable event was a flick or a scroll. If a flick was performed, then the system determines in step 804 whether a next click notification time is greater than the current time. If true, then a notification is displayed in step 805. Alternatively, no notification is provided in step 809.

Similarly, if a scroll was performed, then from step 803 step 806 is performed in which a next scroll notification time is checked against the current time. If the next scroll notification time is greater than the current time, then the notification is displayed in step 805. Otherwise, no notification is provided in step 809.

Once a notification has been displayed in step 805, the system advances the next flick notification time to 24 hours past the current time. Next in step 808, the next scroll notification time is advanced to seven days past the current time. Finally, the procedure ends in step 809.

The following relates to behavior of the notification. The display of the notification may be in accordance with standard notifications in an operating system or an application. For instance, the notification may fade in, be displayed for a number of seconds, then fade away. If a user taps anywhere on the notification, a training procedure may then be launched with the notification disappearing.

Figure 9:
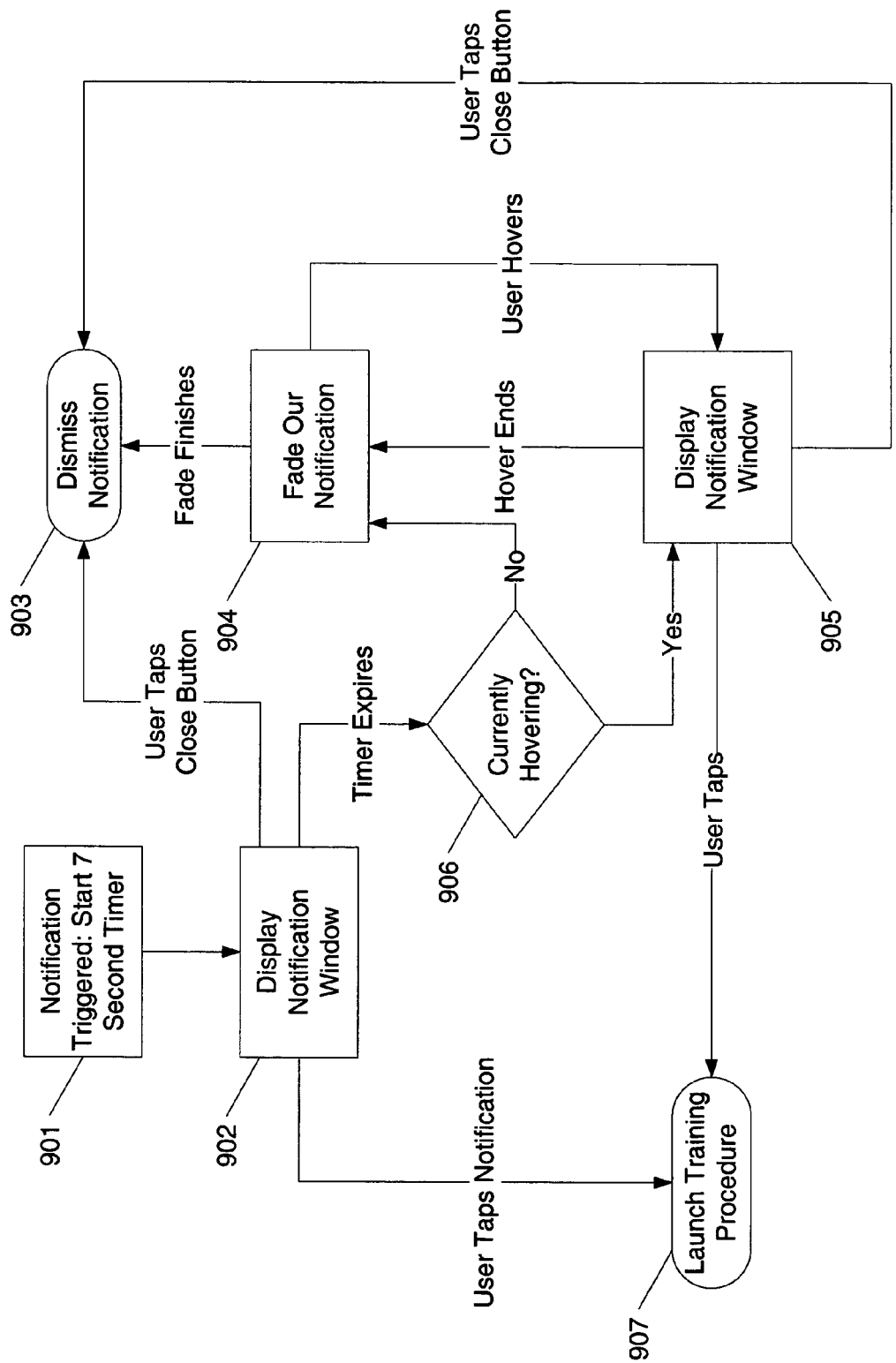
FIG. 9 shows a procedure for displaying a notification in accordance with aspects of the present invention.

FIG. 9 shows an example of the notification handling procedure. In step 901, once a notification has been triggered, a display timer is started (here, a 7 second timer). In step 902, a notification window is displayed. If a user taps a close button, then the notification is dismissed in step 903. If the display timer expires, then the system determines if the user is currently hovering over the notification. If yes, then the notification window is displayed in step 905. If no, then the notification is faded out in step 904. If the user taps notification, then the training procedure 907 is launched. The fadeout finishes in step 903.

If a user hovers over the fading out notification from step 904, then the notification display window is shown in step 905. If a user taps a close button, then the notification is dismissed in step 903. If a user taps the display notification, then a training procedure is launched in step 907. If a user stops hovering over the notification window, then the system fades out the notification in step 904.

Figure 10B:
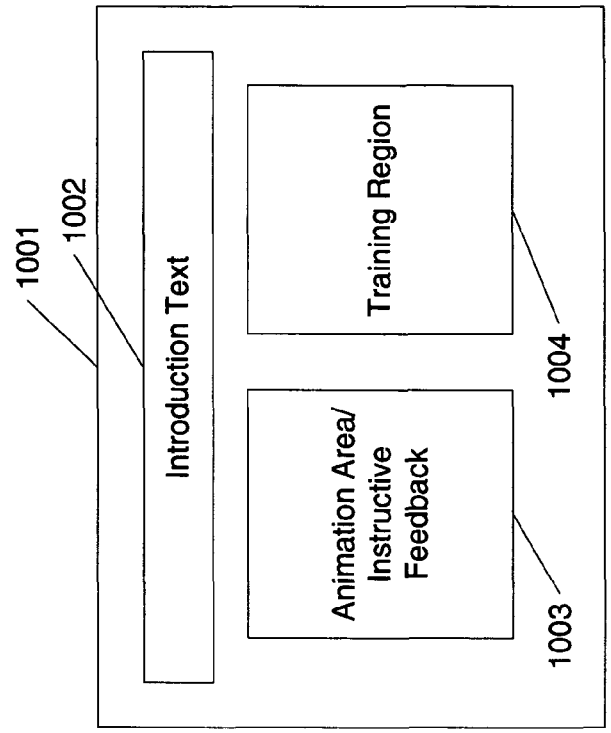
FIGS. 10A-10C show user interfaces for a training procedure in accordance with aspects of the present invention.
Figure 10A:
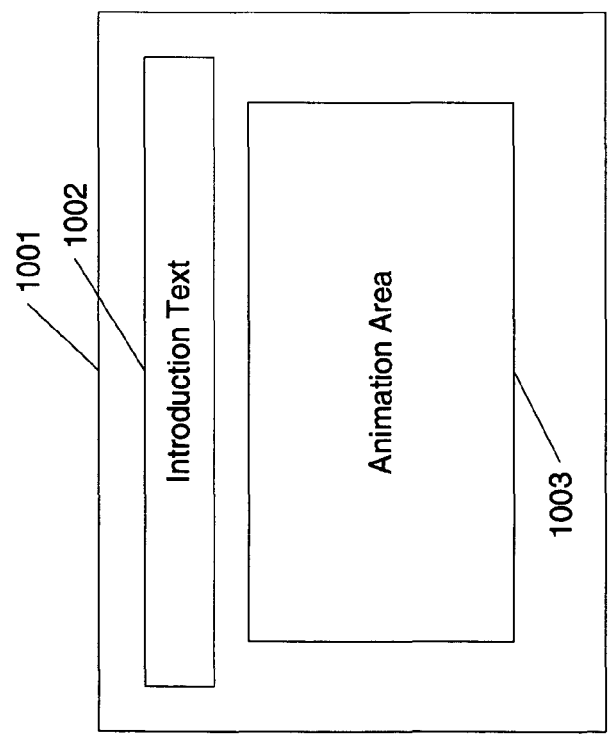
Figure 11:
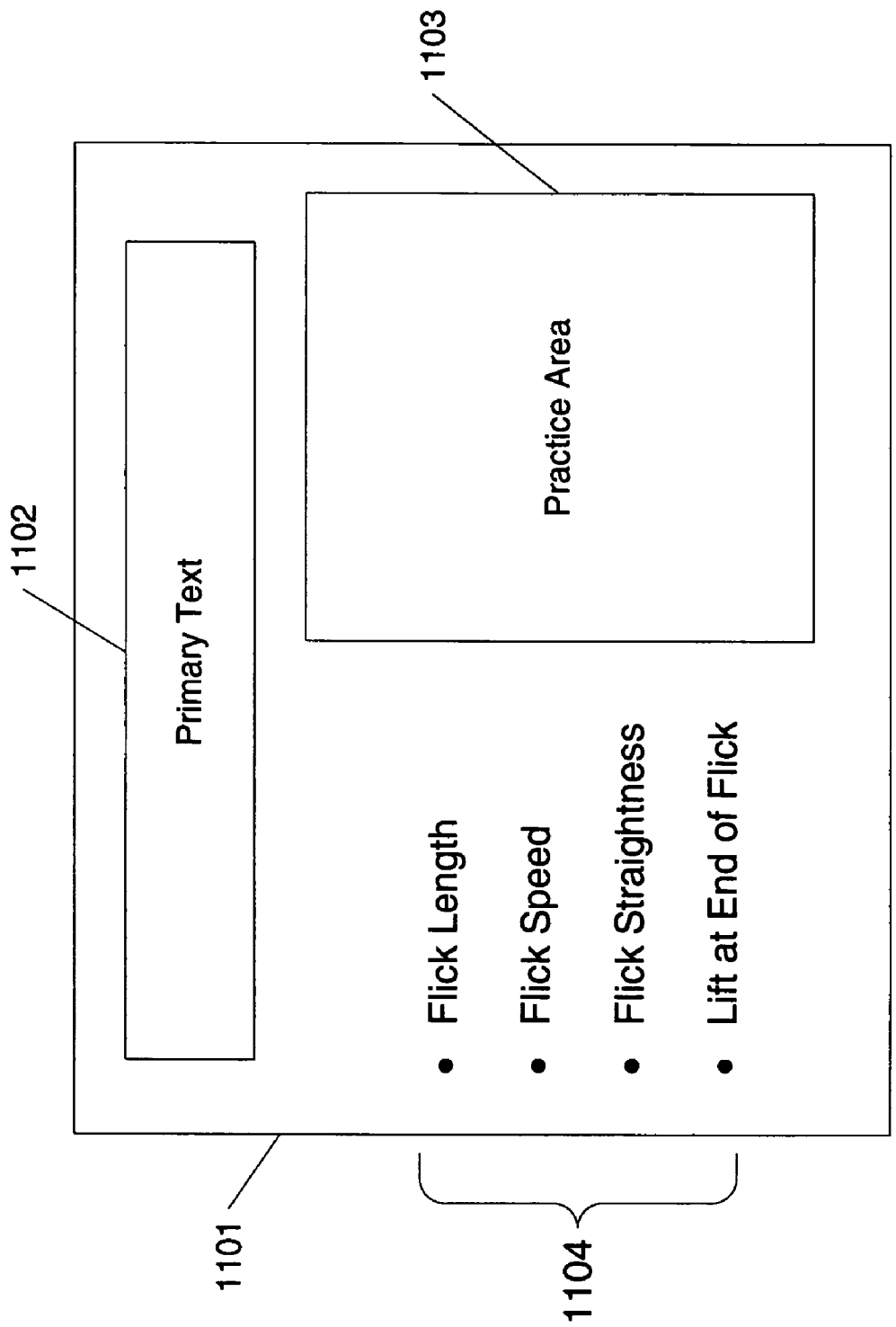
FIG. 11 shows an exemplary user interface for a training procedure in accordance with aspects of the present invention.

The training procedure (for example, a learning wizard which presents the training procedure) may include a number of interfaces. For instance, FIGS. 10A-10B show examples of a training procedure in accordance with embodiments of the present invention. Also, FIG. 3 may be used to show another interface for the training procedure. In FIG. 10A, training procedure 1001 is shown with an introduction area 1002 and an animation area 1003. The introduction area 1002 describes what individual gestures highlighted in the training procedure 1001 all are and how to use them. The animation area 1003 may show a looping animation showing a pen performing one or more gestures. Next or alternatively, FIG. 10B shows training procedure 1001 with introduction area 1002, animation area 1003, and training region 1004. The animation area illustrates the characteristics of the gesture being trained. With respect to flick gestures, the animation area 1003 may include the characteristics that enable the system to recognize flick gestures from training region 1004 and as shown in FIG. 11 below.

The flick training region 1004 is a space reserved for the user to practice performing a gesture. After the user attempts a gesture, the Instructive Feedback Area (used with or in place of animation area 1003) can be updated to inform the user whether or not the gesture was successful, and, if not, why. The feedback area may be textual or may display information graphically (as in FIG. 3) where various items may be highlighted if a gesture is performed correctly.

Flick gestures performed while the flick training page of the training procedure may be processed as follows:

1. The training area 1004 and instructive feedback area (1003 or in addition to region 1003) may respond to flicks that touch any part of the training area 1004. In other words, if any part of the user's flick gesture lies within the flick area, both areas can update to indicate whether or not the flick succeeded. This includes flicks that touch the flick area and also go outside the wizard's window. Flicks that touch any part of the flick area may not cause the associated flick action to fire.

2. Flicks that do not intersect any part of the flick area may be processed normally, following the rules for whatever flick settings are currently in effect for the user. If the user hasn't completed the wizard or used the control panel before, the default settings may be used (for instance, limited flicks (only cardinal directions) with no customizations).

The following describes the training area 1004 with respect to flick gestures.

The training area 1004 for practicing flicks may be represented as FIG. 3 (namely a square and with a center point 301, four or eight arrows radiating out from this point in the flick directions, and graphics at each of the arrow points. Initially the center point 301 of the practice area may contain the text "Start here" or some other indication where to start a flick. As soon as the user attempts a flick, this text or graphic may be replaced by a dot; the dot may remain until the user closes the wizard.

The practice area may respond to the user's flick settings by displaying eight flick direction arrows and graphics if the user has changed his or her settings to handle all flick directions (which is more than the 4 cardinal directions). Also, the practice area may respond to a user's handedness (by displaying information so that it will not be blocked by the user's hand. In this regard, the feedback may appear at a new location so that it can be read while a user is performing a gesture.

The arrows and graphics provided may be shown with low saturation, or grayed out, or in grayscale. Upon detecting a successful flick gesture that touches any part of the training area 1004, the center dot may light up along with the arrow and action associated with the flick. More generally, the arrows and graphics may be rendered differently, more boldly, more colorfully, and the like to emphasize the direction of the gesture.

The center dot, arrow and graphic can stay lit up for a predetermined time (for instance, three seconds, or until the user begins another attempted flick in the practice area, whichever comes first. The only time successful feedback should be shown is when the user performs a successful flick, with the pen (or finger or mouse), in one of the directions currently displayed on the practice area. In other words, if the four direction practice area is displayed it will not show any response to diagonal flicks. The user will be alerted to this and other error cases by text in the instructive feedback area. This is referred to as a null flick action.

Normally, if the user enables the complete flick set, the practice area will appear as illustrated in FIG. 3.

Figure 10C:
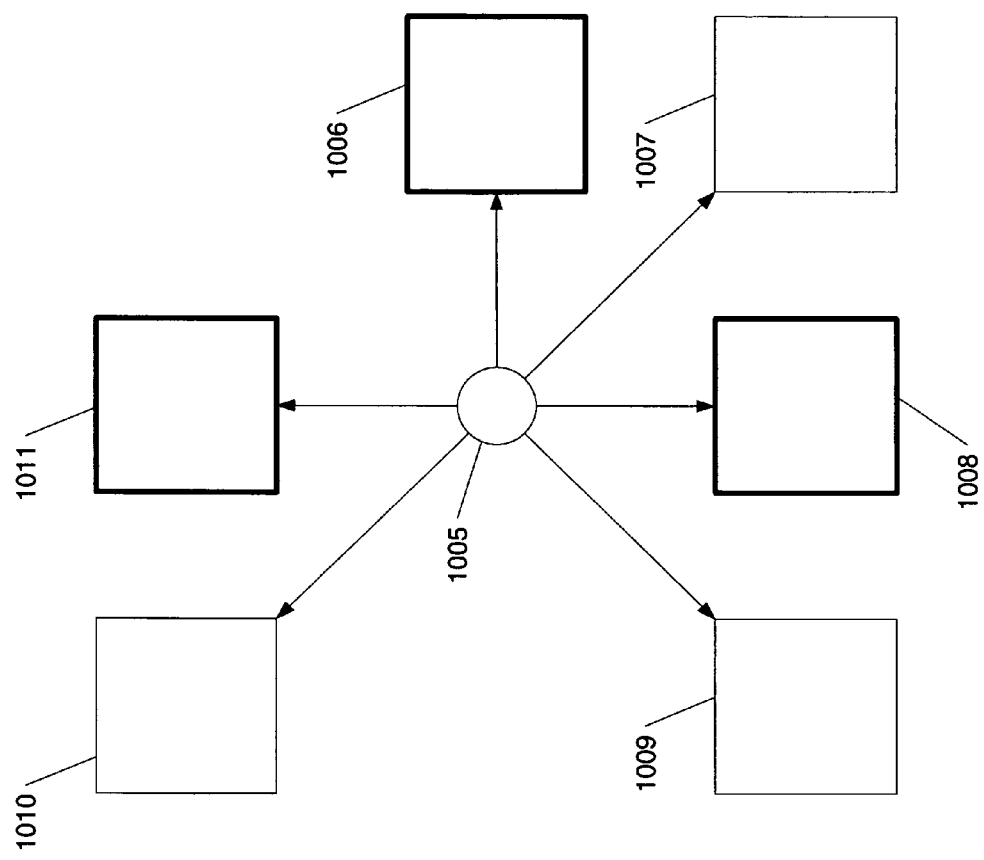

However, if the user maps any flick direction to null, the arrow and feedback graphic for that direction should not be shown in the grayscale graphic on the practice area. For example, if the user maps both the left flick and the up-right flick to null, the practice area will appear as shown in FIG. 10C. FIG. 10C shows starting point 1005 and mapped actions 1006-1011.

If a user performs a successful flick in a direction that is mapped to null, feedback should light up as it would normally. In place of the normal feedback graphic, a warning graphic can be displayed. Like normal feedback in the practice area, this feedback can stay lit up for three seconds or until the user attempts another flick. A message can be displayed in the Instructive Feedback Area 1003 (in place of or in addition to animation area 1003) to alert the user to the fact that the user has flicked in a direction mapped to null.

FIG. 11 shows another illustrative example of a user interface. The user interface 1101 includes a primary text area (for title information and the like) 1102, a practice area 1103, and an instructive feedback area 1104. Practice area 1103 may be blank as shown in FIG. 11 or may include underlying graphics as shown in FIG. 3 or 6.

The instructive feedback area 1104 offers the user text feedback and advice based on the flicks they attempt in the Flick Area 1103. The Instructive Feedback Area 1104 is made up of five parts: a section at the top reserved for primary text (1102), and four sections providing feedback on the attempted flick's length, speed, straightness and terminating pen lift. Of course, it could be made of less than or more than five parts as desired to provide instructive feedback.

When the user attempts a flick in the Flick Area 1103, the primary text section 1102 will update to indicate whether the flick succeeded or not. Each of the four flick attribute sections can be updated to indicate whether or not the flick passed the corresponding part of the detection algorithm. Success with respect to an attribute is indicated, for instance, by a green check mark and green text. Failure is indicated by, for instance, a red X and red text. When a new flick occurs in the Flick Area, the four flick attribute sections can disappear for 500 ms before updating based on the new flick. This delay is intended to make clear that the feedback has been updated based on the flick the user just performed. Alternatively the delay may be increased or decreased as desired.

Initially (before the user attempts a flick), the primary text can prompt the user to practice, focusing on the four flick attributes. The four attribute sections can be filled in with the negative feedback as needed. However, this feedback should not be displayed in red and should not have a red X next to it. Instead, the text should be rendered in gray, and the X should be replaced by a gray bullet. This provides the user with a goal to be achieved (namely, performing a flick that meets all criteria).

If the user attempts to flick with the mouse, the four flick attribute sections will disappear, and the primary text will inform the user that flicks are pen-only gestures. Alternatively, mouse flicks may be permitted in an alternate embodiment.

If the user performs a diagonal flick while the four direction practice area is displayed, the four flick attribute sections may show feedback normally, but the primary text can inform the user that to enable diagonal flicks they will need to click the "Settings" button and change to Complete Flicks. Similarly, if the user flicks in a direction mapped to null, the flick attribute sections can show feedback normally, but the primary text will inform the user that the direction he/she flicked in is disabled.

The following is a list of examples of positive feedback:

| Positive Feedback | |
|---|---|
| Functionality | User Interface Text |
| Feedback about length of the flick | The flick was the correct length. |
| Feedback about speed of the flick | The flick was the correct speed. |
| Feedback about the straightness of the flick | The flick was straight enough. |
| Feedback about lifting the pen at the end of the flick | You lifted your pen quickly enough at the end of the flick. |

The following are examples of negative feedback:

| Negative Feedback | |
|---|---|
| Functionality | User Interface Text |
| Feedback about length of the flick | Make the flick about 10 millimeters long. |
| Feedback about speed of the flick | Perform the flick quickly |
| Feedback about the straightness of the flick | Perform the flick in a straight line. |
| Feedback about lifting the pen at the end of the flick | Lift your pen quickly off of the screen at the end of the flick. |

The display of positive and negative feedback may be the same. Alternatively, they may be displayed in different ways to visually represent whether the messages are positive or negative feedback. For instance, the information may be displayed as red or green with X's or checkmarks, respectively.

The following reflects text that may be displayed in the primary text area:

| Primary Text Area: Initial and Success | |
|---|---|
| Functionality | User Interface Text |
| Initial text (displayed before the user's first flick, along with negative feedback from the table above). | When practicing flicks, be sure to: |
| To indicate a successful flick when all four flick attributes were successful | Congratulations! You performed a successful flick. |

| Primary Text Area: Errors and Failure | |
|---|---|
| Functionality | User Interface Text |
| To alert the user that he or she attempted to flick with a mouse.* | Please use your pen to perform these gestures. They cannot be performed with the mouse.* |
| To alert the user to the fact that he or she performed a diagonal flick with diagonal flicks disabled. | You performed a diagonal flick. To enable diagonal flicks, click the Settings button and select "Enable Complete Flick Set". |
| To alert the user to the fact that he or she flicked in a direction mapped to null. | You performed a flick in a direction you have disabled. To use flicks in this direction, change your mapping in the flicks control panel. |
| To indicate that a flick attempt was unsuccessful because one or more of the attributes failed (displayed when none of the above errors occur) | Try again, concentrating on the flick attributes with X's. |

*It is noted that flick gestures may be limited to being performed only with a stylus, a stylus and a finger, or may include the use of a mouse as well. The example above relates to information when a flick is not allowed to be performed with a mouse.

Finally, the system may allow a user to modify flick gesture settings. The settings may be modified by options displayed on one or more pages. For instance, the sequence of pages may begin with a welcome page that allows the user to either continue through the wizard or open the flicks control panel to make the settings manually. If the user chooses to continue through the wizard, he/she may be presented with a series of pages asking questions how flicks should be configured. Finally, a closing page may summarize the user's choices and inform the user that these settings can be viewed or changed at any time through the flicks an easily locatable icon (for example, in a system tray or on a control panel).

A variety of options may be set. The following lists some options. These may or may not be included with various implementations:

a. Where should flick gestures be enabled?
b. What flick gesture directions should be enabled? (All directions or only the cardinal directions or some other subset)
c. How should the up and down flick gestures behave? (Should the flick gesture move a page or move a scrollbar?)

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A computer implemented method of initiating a gesture training procedure, the method comprising:
    recognizing, via a processor, a gesture movement associated with an input device, the gesture movement initiated by a user, the gesture movement comprising a gesture, wherein recognizing the gesture movement comprises calculating plurality of parameters related to the gesture movement including two or more of velocity, acceleration, lift and curvature;
    based on recognizing the gesture movement, determining that a user interface for gesture training has not previously been presented to the user;
    upon determining that the user interface for gesture training has not previously been displayed to the user, the processor launching a first notification window of a series of notification windows indicating that gesture training is available, wherein launching the first notification window further comprises removing the first notification window after a predetermined time period if no acknowledgment is received from the user;
    receiving acknowledgment of the first notification window from the user, wherein the acknowledgment comprises the user selecting the first notification window;
    upon receiving acknowledgment of the first notification window from the user, the processor displaying the user interface for gesture training to the user, wherein the user interface for gesture training comprises a practice area for practicing gesture, and a feedback area for providing feedback to the user; and
    incident to displaying the user interface for gesture training to the user, disabling the launching of subsequent notification windows.

2. The computer implemented method of claim 1, further comprising:
    determining that one or more settings regarding the gesture movement have been modified by the user;
    upon determining that settings regarding the gesture movement have been modified, disabling the launching of the first notification window.

3. The computer implemented method of claim 1, wherein the launching of a subsequent notification window in the series of notification windows is based on determining that a predetermined number of notification windows in the series of notification windows have been launched.

4. The computer implemented method of claim 1, wherein the launching of a subsequent notification window in the series of notification windows is based on determining that a predetermined period of time has passed since a previous notification window in the series of notification windows has been launched.

5. The computer implemented method of claim 1, further comprising alerting other aspects of a system or an application supporting the computer implemented method, that a performance of the gesture movement coordinated through the input device occurred.

6. The computer implemented method of claim 1, further comprising: interpreting the gesture the current user is performing via an operating system supporting the computer implemented method, and handling an associated parameter set with the gesture movement the current user is performing via the operating system.

7. The computer implemented method of claim 1, further comprising: mapping the gesture movement the user is performing at an operating system; and
    sending an associated parameter set with the gesture movement the current user is performing to an application program for handling.

8. The computer implemented method of claim 1, further comprising: communicating the gesture movement the current user is performing to an application program supported by the computer system, wherein the gesture movement the current user is performing is interpreted by the application program as being a gesture movement.

9. A system having a processor and memory for displaying a notification window indicating that gesture training is available, the system comprising:
    a recognition component utilizing the processor to detect a gesture movement at a digitizer, the gesture movement comprising a flick gesture, wherein recognition comprises calculating plurality of parameters related to the gesture movement including two or more of velocity, acceleration, lift and curvature;
    based on recognizing the gesture movement, a determining component that determines that a user interface for gesture training has not previously been displayed;
    based on determining that the user interface for gesture training has not previously been displayed, a launching component that launches a first notification window in a series of notification windows, the first notification window indicating that gesture training is available, wherein launching the first notification window further comprises removing the first notification window after a predetermined time period if no acknowledgment is received from the user;
    an acknowledgement component that receives acknowledgement of the first notification window from the user, wherein the acknowledgment comprises the user selecting the first notification window;
    based on receiving acknowledgement of the first notification window from the user, a displaying component that displays the user interface for gesture training, wherein the user interface for gesture training comprises a practice area for practicing gesture, and a feedback area for providing feedback to the user; and based upon displaying the user interface for gesture training, a disabling component that disables launching of subsequent notification windows in the series of notification windows.

10. The system according to claim 9, wherein the determining component is further configured to determine that one or more settings regarding the gesture movement have been modified;
   wherein based on determining that the one or more setting regarding the gesture movement have been modified, the launching component disables the launching of the notification window.

11. The system according to claim 9, wherein the determining component is further configured to determine whether the current user has been previously notified a predetermined number of times of the presence of the gesture training.

12. The system according to claim 9, wherein the determining component is further configured to determine that a predetermined period of time has passed since a previous notification window in the series of notification windows has been launched.

13. The system according to claim 9, wherein the recognition component is further configured to recognize a scroll at a scroll bar;
   based on recognizing the scroll at the scroll bar, the determining component is further configured to determine that a predetermined period of time has elapsed since a previous notification window was launched; and
   based on determining that a predetermined period of time has elapsed, the launching component is further configured to launch a notification window in the series of notification windows.

14. A computing device having stored computer-useable instructions that when executed by the computing device perform operations for initiating a gesture training procedure, the operations comprising:
   recognizing a gesture movement associated with an input device, the gesture movement comprising a flick gesture, the gesture movement initiated by a user, wherein recognizing the gesture movement comprises calculating plurality of parameters related to the gesture movement including two or more of velocity, acceleration, lift and curvature;
   based on recognizing the gesture movement associated with the input device, determining that a user interface for gesture training has not previously been displayed;
   upon determining that the user interface for gesture training has not previously been displayed, determining that a number of notification windows that have previously been displayed is less than a predetermined number, the notification windows indicating that gesture training is available;
   based on determining that the number of notification windows that have previously been displayed is less than the predetermined number, determining that a predetermined period of time has elapsed since a last notification window of the number of notification windows was displayed;
   based on determining that the predetermined period of time has elapsed since the last notification window of the number of notification windows was displayed, launching a new notification window;
   receiving acknowledgment of the new notification window from the user, wherein the acknowledgment comprises the user selecting the new notification window;
   upon receiving acknowledgment of the new notification window, displaying the user interface for gesture training, wherein the user interface for gesture training comprises a practice area for practicing gesture, and a feedback area for providing feedback to the user; and
   incident to displaying the user interface for gesture training, disabling the launching of subsequent notification windows.

15. The computing device of claim 14, further comprising:
   determining that one or more settings regarding the gesture movement have been modified by the user;
   upon determining that settings regarding the gesture movement have been modified, disabling the launching of any of the number of notification windows.

* * * * *